Sept. 26, 1961     H. S. KNOWLES     3,002,058
ELECTRO ACOUSTIC TRANSDUCER

Filed March 7, 1958     6 Sheets—Sheet 1

INVENTOR.
Hugh S. Knowles
BY
Wayne S. Stone
Atty.

Sept. 26, 1961  H. S. KNOWLES  3,002,058
ELECTRO ACOUSTIC TRANSDUCER
Filed March 7, 1958  6 Sheets-Sheet 3

INVENTOR.
Hugh S. Knowles
BY
Atty.

Sept. 26, 1961   H. S. KNOWLES   3,002,058
ELECTRO ACOUSTIC TRANSDUCER
Filed March 7, 1958   6 Sheets-Sheet 4

Fig. 17.

INVENTOR.
Hugh S. Knowles
BY
Atty.

Sept. 26, 1961   H. S. KNOWLES   3,002,058
ELECTRO ACOUSTIC TRANSDUCER
Filed March 7, 1958   6 Sheets-Sheet 5

INVENTOR.
Hugh S. Knowles
BY Miguel S. Stone
Atty.

Sept. 26, 1961 H. S. KNOWLES 3,002,058
ELECTRO ACOUSTIC TRANSDUCER
Filed March 7, 1958 6 Sheets-Sheet 6

INVENTOR.
Hugh S. Knowles
BY
Atty.

United States Patent Office 3,002,058
Patented Sept. 26, 1961

3,002,058
ELECTRO ACOUSTIC TRANSDUCER
Hugh S. Knowles, Glen Ellyn, Ill.
(9400 Belmont Ave., Franklin Park, Ill.)
Filed Mar. 7, 1958, Ser. No. 719,958
17 Claims. (Cl. 179—114)

This invention relates to electro mechanical transducers and particularly to those small transducers used as microphones and receivers in hearing aids or as phonograph pickups. This invention provides improvements in the transducers disclosed in United States Patents No. 2,912,522 and No. 2,912,523, both dated November 10, 1959.

The invention seeks to provide means for easily adjusting the components of the assembled transducer so as (1) to establish certain static magnetic conditions in the reed, i.e., no effective drop of magnetomotive flux along the reed, and (2) to equalize the gross amount of flux in the clamped and working gaps. In order to clarify the foregoing objects, applicant will treat on that part of the theory of these transducers which is pertinent to the problem here sought to be overcome.

Figure 18:
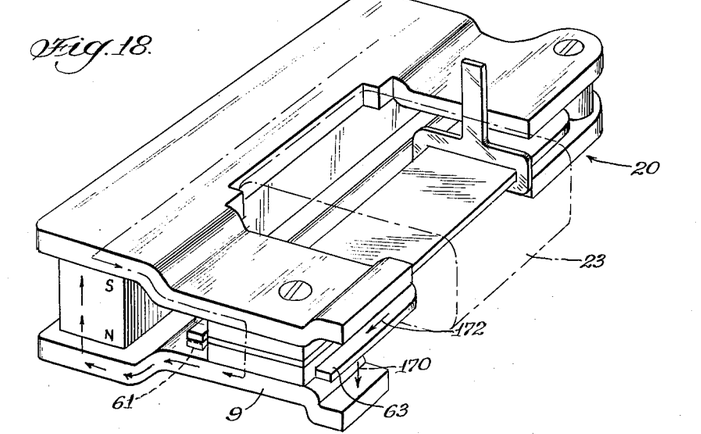
FIGURE 18 is a schematic perspective view of a single magnet transducer of the type shown in U.S. Patent No. 2,912,522.
Figures 19, 20, 21:
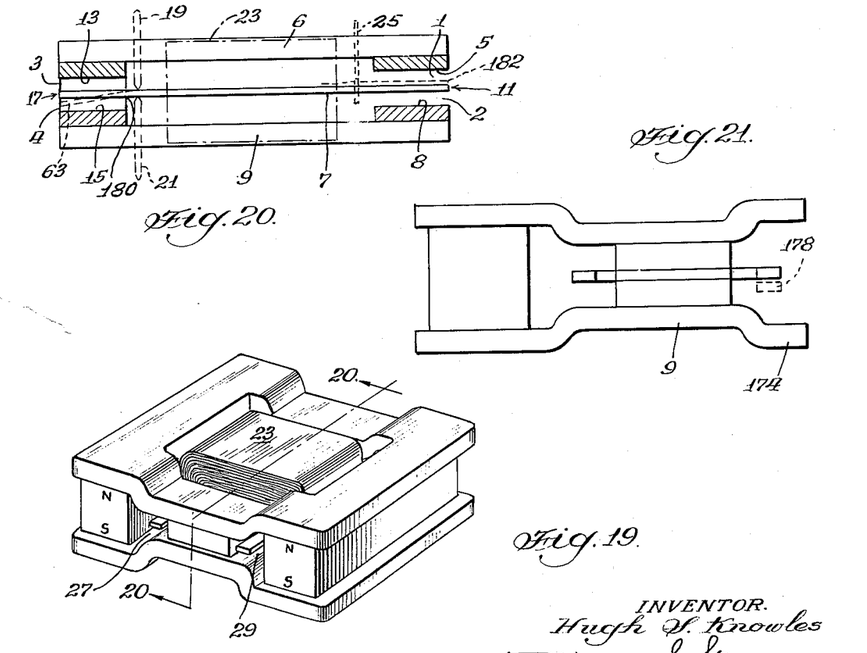
FIGURE 19 is a schematic perspective view of a twin magnet transducer of the type shown in U.S. Patent No. 2,912,523.
FIGURE 20 is a schematic view taken on the line 20—20 of either FIGURE 18 or FIGURE 19.
FIGURE 21 is a schematic end elevation of a transducer of the type shown in FIGURE 18.

These transducers are of the type wherein two pole pieces are spaced by at least one magnet, as in FIGURE 18 herein and see United States Patent No. 2,912,522, or by two identical magnets, as in FIGURE 19 and see United States Patent No. 2,912,523. Portions of the pole pieces are upset toward each other to form two gaps, in one of which, called the clamped or fixed gap, an armature is rigidly clamped along a line transverse to its length. In the other, called the working gap, the other end of the armature is free to vibrate. Adjacent at least one side of the clamped gap is a space which serves as a straight passageway from the external surface of the transducer to the edge of the armature adjacent the clamp line. The principles hereinafter discussed extend to similar structures where, however, the armature is fulcrumed at a point outside either gap and is vibratable in both gaps. For purposes of explanation, FIGURE 20 is a schematic view taken along the line 20—20 of either FIGURE 18 or FIGURE 19.

Referring now to FIGURE 20, the numerals 1 and 2 identify air gaps between the face of the pole piece 6 and armature or reed 7 and between the reed 7 and face 8 of the pole piece 9 respectively. The entire gap, that is between the faces 5 and 8 is called the working gap 11. The numerals 3 and 4 indicate washers of minimum flux conductivity respectively between the face 13 of the pole piece 6 and the reed 7 and the reed 7 and the face 15 of the pole piece 9. The entire gap, that is between the faces 13 and 15, is called the clamped gap 17.

Problems arise due to the small dimensions of these gaps and the mechanical difficulty in obtaining uniformity. In the physical embodiment shown in FIGURES 1 through 17, the gaps 1, 2, 3 and 4 are 0.004 inch and the reed is 0.009 inch. The dimensions of the pole pieces and other components are relative thereto. The parts are stampings and the metals employed are selected for the particular flux conductive task that the part must perform. Thus the pole pieces are made of a metal of high flux saturation density, 14,500 to 20,000 lines per square centimeter, so as to best conduct the steady D.C. flux and comparatively strong flux from the permanent magnet or magnets. Such a metal has moderate permeability and therefore must have substantial cross section to respond well to the weak variable or alternating signal flux generated in or by the coil. Conversely, the reed is made of a metal of high permeability, with a saturation density of only 6,000 to 8,000 lines per square centimeter. The spacers 3 and 4 are made of a metal of low flux conductivity. The magnets themselves are made of another metal, and the clamping screw of another metal. Despite the most accurate dies and jigs, and the most careful assembling, only about twenty percent of the assemblies will find the free end of the reed 7 properly centered in the gap 11. Moreover, geometrical centering of the reed in the gap 11 does not necessarily result in magnetic centering, i.e., zero flux flowing down the reed when the system is at rest.

Magnetic centering of the reed requires meeting one condition, and approaching another is desirable. The principal condition is that when the system is at rest, no flux should act along the reed. A desirable condition is equalized flux density across the two gaps. In the past, this last condition has been obtained only by geometric configuration of the parts and manufacturing precision. This is not accurate. The principal condition has been obtained by centering the free end of the reed in gap 11, i.e., by applying a pin 19 downwardly or a pin 21 upwardly to give the reed a set until the reluctance of the combined gaps 1 and 4 equals the reluctance of the combined gaps 2 and 3. These two adjustments are made in a jig with the components including the coil 23 and the drive pin 25 mounted on the reed 7. The balancing of gaps 1 and 4 may be obtained with considerable accuracy at this stage of the assembly.

When, however, the drive pin 25 is connected to the diaphragm and placed in the case, the components no longer may be magnetically balanced and some means must be provided for effecting both conditions, firstly equalizing the gross flux across the gaps 17 and 11, and secondly, balancing the opposing flux acting along the reed when the system is at rest. Copending application Serial No. 730,082, filed April 22, 1958 is directed to reducing or increasing the flux entering the reed at the fixed gap by shunting flux in the air adjacent the gaps 3 and 4, i.e., in the spaces 27 and 29 in FIGURES 18 and 19.

A feature of this invention is an armature having side wings adjacent that portion of the armature within the clamped area and extending beyond the clamp line. The wings may be unbroken from the main body or separated by a weak wall or as in the pitchfork type, completely separated except at the point of joinder near the clamp line. These wings may be used to effect both conditions discussed above.

Another object is to provide openings in the wall of the case so that access may be had through the straight passageway to the adjusting means including the reed itself without opening the case.

Another object of this invention is to effect the reed adjustment by a means mounted through the case to the exterior so that the closed cavity of the transducer may remain sealed. These transducers are sealed when shipped to the hearing aid manufacturer and are not to be reopened. A feature of one embodiment of this invention is the mounting of a screw whose slotted head is exposed in the surface of the case and which is adapted to vary the position of a wire fastened to the reed within the back sound cavity of the instrument which remains sealed.

There is also disclosed a modified form of reed. This has a T-plan configuration with the forward edge of the T extending beyond the clamp line into the vibratable portion of the reed. It is easy to mount and produces some of the results obtained by the pitchfork type of reed, but less effectively.

There are several ancillary objects attained by the principal embodiment of this invention shown in FIGURES 1 through 17. Firstly, applicant desires to provide a relationship between the magnets and the other operating elements of the transducer motor such that the latter may be completely and permanently assembled, and then the magnets added. One of the features of this invention is the provision of a magnet having a sloping surface which may be wedged into a complementary surface on one of the pole pieces. The high uniformity of operating characteristics of any type of small transducer utilizing these wedge magnets will be explained hereinafter.

Another object of this invention is to provide a novel arrangement of assembling the transducer and diaphragm in the case. An electro-acoustic transducer leaves the plant in a case which the hearing aid manufacturer does not open. Assembling the working parts of the hearing aid in the case can be time-consuming. One of the features of this invention is the provision of a pole piece which also acts as the base, with means for mounting the diaphragm on one side and the motor on the other. This pole piece has a peripheral shoulder which is clamped between itself and the edge of the casing and the lid.

Another object of this invention is to provide a new and improved means for mounting the coil around the armature. In this type of transducer, the armature, which is called herein the "reed," is free to vibrate inside the coil. In the past, the bobbin carrying the coil has been mounted on the pole pieces or some other part of the transducer frame. One of the features of this invention is a bobbin having arms which are mounted adjacent that portion of the reed that is clamped into the transducer motor. A second embodiment of this bobbin consists of two independent arms formed of electrically-conductive material whose ends are mounted in the fixed gap but insulated with respect to adjacent members in the gap and the rivet so that the leads from the coil may be affixed to the bobbin arms respectively. The other ends of these arms either extend through the casing or are fastened to electrically-conductive members mounted through the casing wall adjacent the point.

Still another object of this invention is to provide a transducer in a square casing which will have a maximum length reed with maximum length magnets. One of the features of this invention is positioning the reed along a diagonal of a square casing. This enables applicant to obtain a maximum length reed and at the same time have magnets of ample length. An incidental feature of this arrangement is the creation of two small corner compartments in one of which sits the Thuras tube. In the other may be positioned the posts for the conductor leads, or possibly a second Thuras tube.

The invention is disclosed in drawings wherein.

Continuing to refer to the drawings, particularly FIGURES 1 to 4, the numeral 10 identifies a pole piece which also acts as a base for the transducer motor. This pole piece 10 has a square shape and has formed integrally therewith upwardly directed lands 12 and 14, whose upper faces 16 and 18 lie in a common plane and constitute one face of two gaps of low flux conductivity which are generally identified by the arrows 20 and 22. Transversely through the two land portions of the pole piece 10 are holes 24 and 26 with flared openings on their lower side to receive the beveled heads of rivets 28 and 30.

Figures 1, 5, 6, 7, 8, 9, 10:
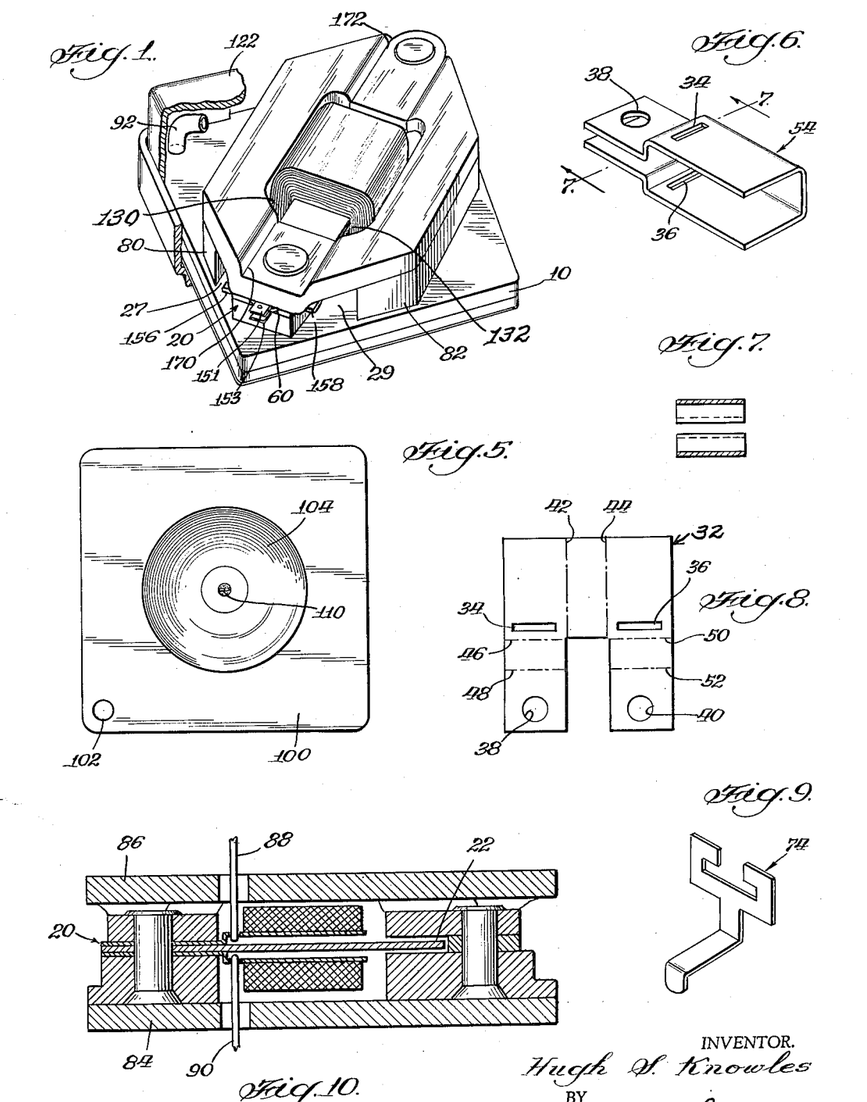
FIGURE 1 is a perspective view with the casing largely cut away of applicant's electro-acoustic transducer.
FIGURE 5 is a view of the diaphragm taken on the line 5—5 of FIGURE 4.
FIGURE 6 is a perspective view of one form of bobbin.
FIGURE 7 is a view taken on the line 7—7 of FIGURE 6.
FIGURE 8 is a plan view of the bobbin stamping prior to its having been shaped.
FIGURE 9 is a perspective view of the drive pin.
FIGURE 10 is a schematic view similar to FIGURE 3, illustrating how pins are used to adjust the reed in the gap.
Figure 2:
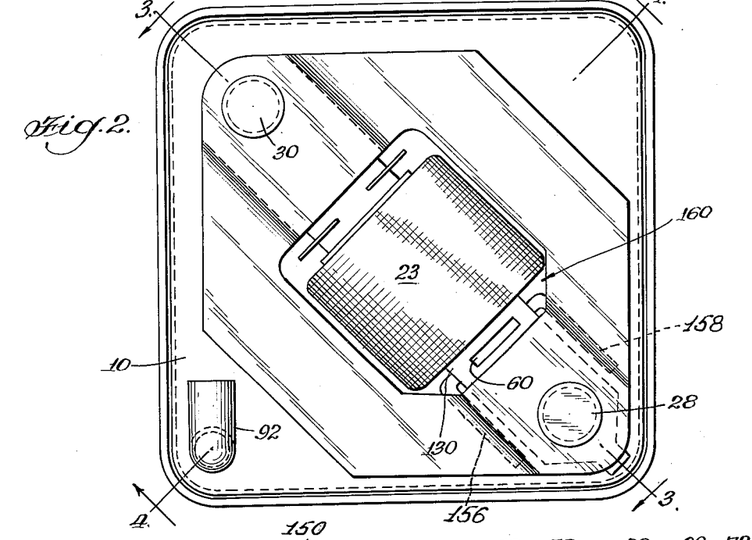
FIGURE 2 is a plan view of the motor taken immediately under the lid and taken along the line 2—2 of FIGURE 4.

Mounted on the rivet 28 is a reed bobbin and coil assembly. Referring to FIGURES 6, 7 and 8, a stamping 32 having through adjustment pin openings 34 and 36 and rivet openings 38 and 40 is bent along dotted lines 42 and 44 in the same direction and then along the lines 46 and 48 and 50 and 52 in reverse direction to produce the bobbin shown in FIGURE 6 and bearing the general numeral 54. As assembled in FIGURE 6, the rivet openings 28 and 30 are in axial alignment as are the adjustment pin openings 34 and 36.

This bobbin 54 is placed on a coil-winding machine which includes a pair of bushings which are mounted over the ends of the bobbin 54. The wire is wound around the bobbin between the bushings while concurrently applying cement or dipping the wire in cement immediately before winding. This is in accord with standard practice. Upon producing the requisite number of turns, the bushings are withdrawn and the coil holds the shape illustrated in FIGURES 3 and 4. This is a self-supporting coil, but the bobbin is necessary in order to relate properly the coil to the reed.

Figure 13:
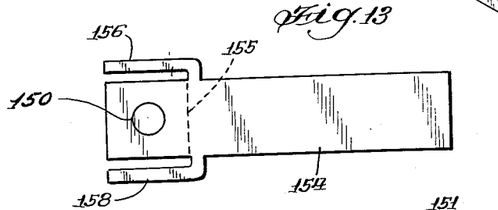
FIGURE 13 is a plan view of the pitchfork type reed. The complete red assembly is shown in FIGURE 14.

An armature 60 (usually called a reed where it is clamped at one end in a gap) has the generally rectangular shape shown in FIGURE 13, with, however, two wings 156 and 158 extending from a point outside the clamped portion of the reed, designated by the clamp line 155. These wings extend along the reed in the spaces 27 and 29, see FIGURE 1. The reed has a hole between the wings. The reed is flanked by the lands 62 and 64 of low flux conductive material of the bobbin 54 and they are mounted on a rivet 28. A drive pin 74 is slipped over the other end of the reed 60. This reed is called a pitchfork reed.

Figure 3:
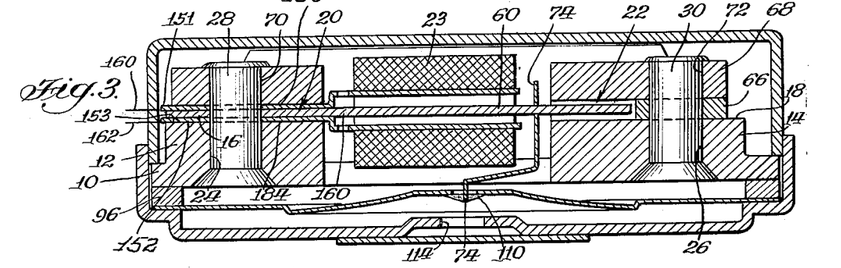
FIGURE 3 is a sectional view taken on the line 3—3 of FIGURE 2.

The entire assembly is mounted in FIGURE 3 on the rivet 28. A spacer 66 is mounted on the other rivet 30. The spacer 66 has exactly the same thickness as that of the two lands 62 and 64 of the bobbin 54 plus the reed 60. A second pole piece 68 having two holes 70 and 72 is mounted on the rivets 28 and 30. Thereupon, the heads of the rivets are swedged and the motor is in assembled relationship, with, however, the drive pin 74 unconnected at its lower end and with the magnets not mounted. The pole pieces 10 and 68 are made of identical high saturation, flux-conductive material, i.e., 14,000 to 20,000 lines per square centimeter.

Figure 4:
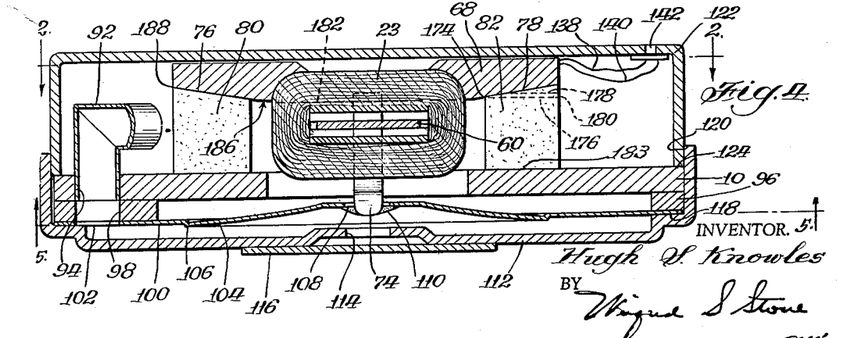
FIGURE 4 is a sectional view taken on the line 4—4 of FIGURE 2.

Referring now to FIGURE 4, attention is invited to the sloped lower faces 76 and 78 of the pole piece 68. These slope inwardly and downwardly so as to create a recess which is narrower near the reed than at the outer edge. Applicant provides magnets 80 and 82 which have one side surface beveled. With the coil fully assembled between the pole pieces, the magnets 80 and 82 are slipped into position from the side and are there held by a spot of quick-drying adhesive.

At this point, the transducer motor is completed and it is placed on a testing machine for balancing the flux through the two gaps 20 and 22. The step is schematically illustrated in FIGURE 10 where the motor is shown clamped between a mounting 84 and a jaw 86. The fingers 88 and 90 are mounted for vertical movement independently of one another and an operator studying an oscilloscope connected to the coil leads of the transducer engages the reed with either the upper adjusting pin 88 or the lower 90, thereby changing the position of the free end of the reed in the gap 22 until balance is attained. This adjusting is done in the absence of the diaphragm and it is desirable to do it at this time because the adjusting can be done rapidly.

This having been completed, the Thuras tube 92 is press fitted into an opening 94 in the base pole piece 10, refer to FIGURE 4. The assembly is inverted and dropped into a brass casing 122. An aluminum spacer ring 96, having the hole 98 for registry with the Thuras tube, is positioned as shown in FIGURE 4 and the diaphragm 100 is pressed over this ring. Alternatively, this ring 96 may be made of magnetic material and resistance welded to the pole piece. There is a hole 102 in the diaphragm 100 for communication to the Thuras tube 92. The diaphragm 100 is substantially square and has centrally a circular vibratory portion 104 defined by a reverse bend 106. This circular portion 104 is slightly dished as illustrated in FIGURES 3 and 4, and there is a central hole 108 into which seats the lower end of the drive pin 74. A rigid connection between the two is established by means of a spot of adhesive 110. The pole piece 68 does not engage the bottom of the casing 122 because the pole piece 10 engages the peripheral edge of the casing at 124. Thereupon, a lid 112 having a central sound opening 114 covered by a nylon fabric 116, and having a shoulder 118 is seated over the diaphragm and fitted around its inner wall at 120 to the outside of the casing 122. The base pole piece 10 upon which the working parts of the motor are mounted is squeezed between the shoulder 118 and the normal edge 124 of the casing 122. The coil leads 138 and 140, see FIGURE 4, are carried either around the ends of the magnets or over the pole piece 68 where they are carried through a pair of openings by brass conductors such as 142.

Figure 12:
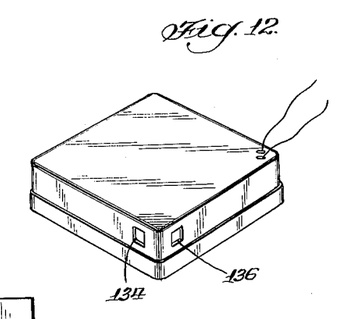
FIGURE 12 is a reduced perspective view taken from the same position as FIGURE 1, but with the casing in position for the purpose of showing small openings in the casing through which the adjusting tool may be inserted.

Returning now to FIGURE 1, applicant invites attention to the passageways 27 and 29. These passageways extend back to the point 130 and 132 where access may be had to the reed 60. Referring now to FIGURE 12, applicant's sealed transducer is shown as having two openings 134 and 136 which are in alignment respectively with the passageway 130 and 132. By inserting a tool through one or both of the openings 134 and 136, one can further adjust the position of the free end of the reed 60 in the gap 22 even though the transducer is completely sealed. The positioning of these openings 130 and 132 (one may suffice) so that it is possible to adjust the reed with the casing sealed, is responsible for salvaging a large number of rejects in a product where because of the high performance required, the percentage of rejects is very high.

Referring to FIGURE 9, applicant shows the drive pin 74 in perspective. This pin is substantially rigid and makes it possible to mount the motor in a casing of a selected configuration with a maximum of efficiency without being limited to position the center of the diaphragm in transverse alignment with the point on the reed held by the drive pin. Use of an offset drive pin has contributed greatly to the compactness of the transducer unit.

While applicant has shown the wedge-shaped magnet in a transducer employing two magnets, it will be appreciated that it will be equally useful in any situation where a magnet has a pole piece at either end and assembling is based upon means for holding the pole pieces together, and not upon the magnet. Thus, in applicant's copending application disclosing the shunt bar transducer S.N. 436,416 which is widely used in the industry today, only a single magnet is used and the pole pieces are U-shaped structures. Schematic FIGURE 18 shows such a transducer.

The advantages of this wedge-shaped magnet are substantial. When one is assembling the transducer by one or more rivets or nuts with the magnet or magnets in position, one does not necessarily get a good contact between the upper and lower ends of the magnet and the associated surfaces of the pole pieces. These transducers are made to an accuracy of 1/10,000 of an inch, and if a spacer in the fixed gap 20 is a little bit off in thickness, it will tend to rock by bending the pole piece 68, referring to FIGURE 4, along the corner 174. This would cause a progressively increased gap between the dotted line 176, which represents the face of the standard magnet in use today, and the position of the pole piece engaging surface 178. The net result is that the flux would not enter the pole pieces properly, and the transducer might not be brought up to functioning specifications. Further, if the stack which the rivet 28 must clamp is excessively thick, then the pole piece may be pivoted on the corner 180, still referring to FIGURE 4, with a similar net result.

This does not occur in the case of applicant's wedge-shaped magnet. The base of the plate which is clamped in the stack, that is, the surface represented by the dotted line 182, forms the same but opposite angle with the sloping surfaces 76 and 78. This can be done with good dies with great accuracy. Similarly, the surface 183 of the base magnet 10 is very flat. It follows that if the gross thickness of the materials between the surfaces 76 and 78 remain the same, when the magnet is pushed in from the side, the least that can happen is that it will be pushed in too far or too little. The flux conductive faces of the magnet and the pole piece will be in full engagement. The width of the magnet, referring to FIGURE 4, is less than the total depth of the sloped surfaces 76 or 78 of the pole piece 68, which terminate at points such as 186. The degree of variation in the thickness of the reed or bobbin arms varies within known limits and consequently all that is necessary is to make the vertical dimension of the magnet such that it will always be between the outer edge 188 and the line 186. By this construction, applicant gets a good flux-conductive surface into both pole pieces from the upper and lower ends of the magnet, and this is attained irrespective of even substantial variations in the thickness of the gap 22. All of this equally applies to the open gap 22 which is maintained by the spacer 66. It is true, however, that the range of thickness of the single spacers 66 can be kept down substantially below what can be attained at the closed gap 20.

Figure 14:
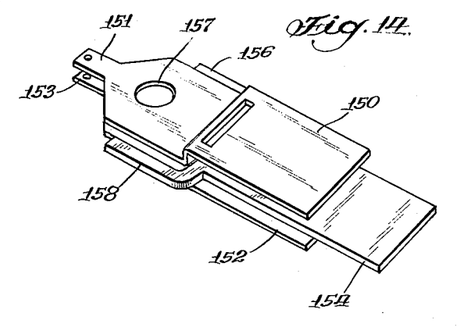
Figure 15:
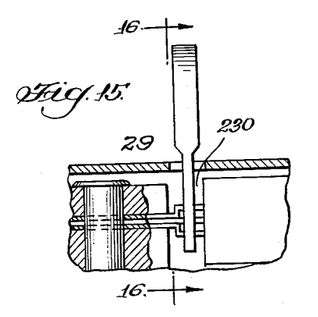
FIGURE 15 is a sectional view of a portion of FIGURE 3 showing an opening in the case in alignment with the held end of the reed with a tool holding the reed for adjustment from outside.
Figure 16:
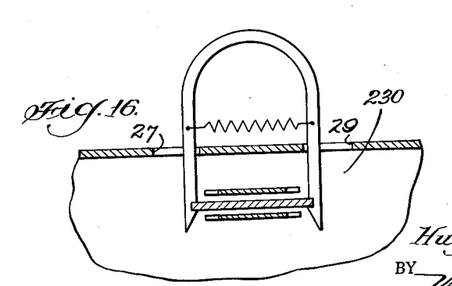
FIGURE 16 is a view taken on the line 16—16 of FIGURE 15.
Figure 17:
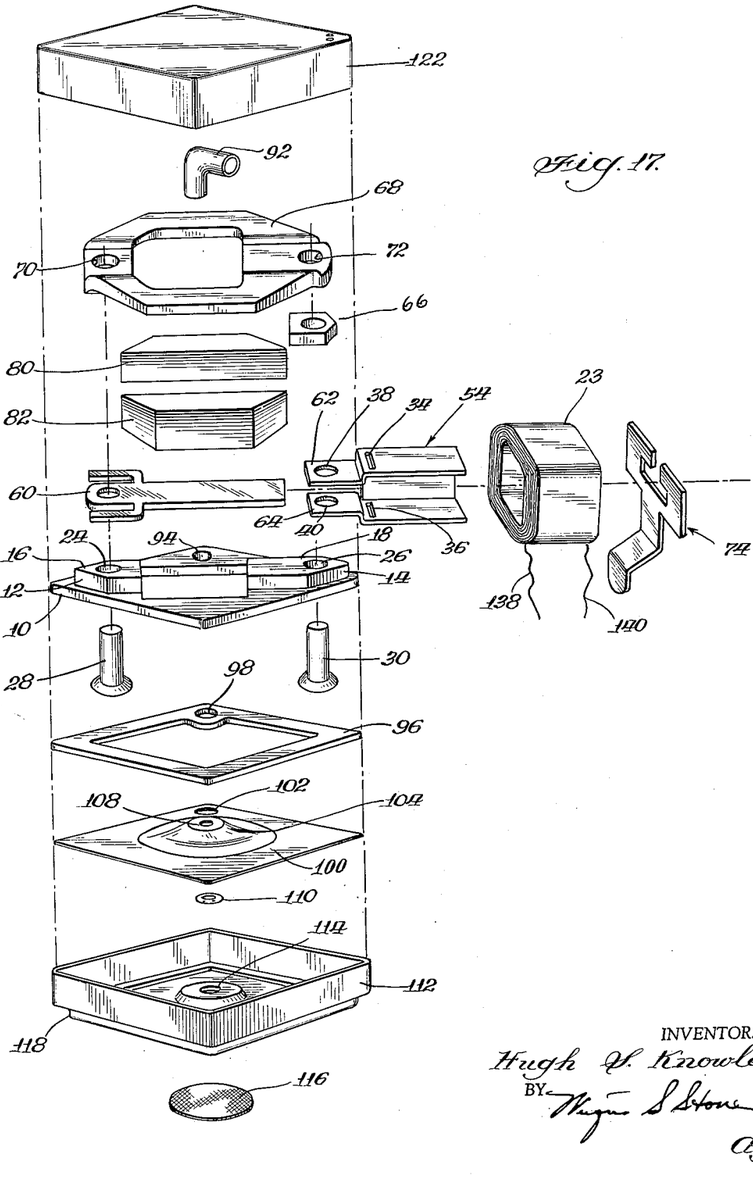
FIGURE 17 is an exploded view of the parts.

In FIGURE 14, applicant shows a perspective of a preferred form of bobbin and reed. Here the bobbin consists of two separate brass arms 150 and 152 having a hole 157 positioned for mounting on a rivet. The reed 152, however, has two trailing wings, one on each side, 156 and 158. The position of these wings in the motor is indicated by the dotted lines 156 and 158 in FIGURE 2. Referring to FIGURE 3, these wings extend from the reed at the point 160 and it follows that by pressing the ends of these wings 156 and 158 either up or down, a movement in the opposite direction will be effected in the reed 154. These wings are in alignment with the openings 134 and 136 in FIGURE 12, which openings in an embodiment employing the reed 154 will be correspondingly reduced in size. Although the reed is made of comparatively soft material, experiment has shown that the wings 156 and 158 will raise or lower the free end of the reed 154. Because the tips are close to the openings 134 and 136 in the casing, very exact functioning can be obtained. Importantly, the holes 134 and 136 are so small that after final adjustment, they may be closed with a quick drying adhesive, so that workmen of the hearing aid manufacturer will not accidentally upset the working components of the transducer.

Returning to FIGURE 14, the twin arms 150 and 152, which constitute the bobbin, are connected respectively to the two leads from the coil and referring to FIGURE 3, upon assembling the parts on the rivet 28, the brass arms 150 and 152 are painted with an insulating material which confines the electric current to the arms. Small ears 151 and 153 at the ends of the arms are used as posts to which are attached leads carried through the casing wall by any suitable means. The ears 151 and 153 themselves may be carried through the casing wall.

In applicant's type of transducer, the element that determines the maximum dimension of the transducer is the reed. Where a circular casing is used, the reed was centered on one diameter. Where a rectangular or square case was used in the past, the reed was parallel to one of the sides. The transducer here presented utilizes the diagonal of the square as the length-wise position of the reed. This makes it possible to reduce the width of the casing. In the case of the square, the balanced magnets on each side of the reed are retained although they are sheared off at their ends. It will be appreciated that this arrangement can be used in the case of rectangular cases, and indeed this six-sided configuration could be rounded off at either end and used in a circular casing. The extra room at each side of the two magnets would be available for the Thuras tube.

Figure 26:
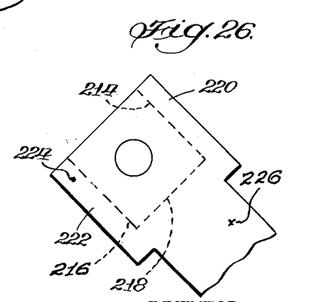
FIGURE 26 is a view similar to that in FIGURE 23 and shows another modified armature.

To a lesser extent the advantages of the wing or pitchfork type of reed may be obtained by a T-shaped reed which is clamped in the fixed gap inside the T-portion. FIGURE 26 is a plan view only showing the clamp lines 214, 216 and 218. The reed is integral, having tab portions 220 and 222. By applying a force downwardly at the point 224, the clamp line 218 will act as a fulcrum across the entire T causing the point 226 to rise. This effects some of the purposes obtained by the armature 7 of FIGURES 18 through 21 but to a lesser extent. In this structure the clamp lines 214 and 216 may be grooved slightly so as to make it more easy to bend the wing (or tab) but without substantially reducing flux flow.

Adjusting

Adjusting the microphone by means of the wings will be described in connection with the schematic FIGURES 18, 20 and 21 because the physical movement of the wings can be better seen in a device where one side of the armature is open. The leads of the coil are connected to a testing device, the nature of which is not pertinent here, and this device will indicate when flux is flowing down the reed. If we accept the pole piece 6 as north, then conventionally flux is flowing from the pole piece 6 to the pole piece 9, but assuming there is a flow from left to right in FIGURE 20 along the reed 7, the combined reluctance of the gaps 2 and 3 must be less than the combined reluctance of the gaps 1 and 2. It follows that by lowering either the wing 61 or the wing 63, that is, moving it in the direction of the arrow 170, flux in the reed will be shunted along the arrow 172 and then across the air space to the portion 174 of the lower pole piece 9. The reluctance of the gap 17 will be lowered. We are assuming for the moment that there is a bending of the wing along a line 176. The lowered position is indicated by the dotted end of the wing 178 in FIGURE 21. When the wing has been lowered to a point where flux no longer moves down the reed, the instrument is in magnetic balance. This principle is illustrated in copending application Serial No. 730,082, filed April 22, 1958, and forms part of the invention therein.

In the instrument employing these wings attached to the armature in advance of the clamp line 180 there is in fact no bending along the line 180. Instead, the clamp line 180 acts as a fulcrum and when the wing 63 is pressed down, the working end of the comparatively soft armature is bent up as indicated by the dotted position 182 in FIGURE 20. The reed takes a slight set. The movement of the working end of the reed upwardly reduces the gap 1, thereby reducing its reluctance while the wing 63 is reducing the reluctance of shunting flux to the pole piece 9. It follows that the two movements reinforce each other and therefore in order to adjust the instrument the wing 63 need not be pushed down so far as is required if it were bending along the line 180 only. The advantage of this arrangement resides in the adjustment being made at both gaps.

Quite frequently, it will not be possible to balance the instrument by moving one or both wings together downwardly or upwardly. This is attributed to a wide disparity between the gross flux across the two gaps. As explained in the copending application, movement of one wing down and the other wing up tends to equalize the gross flux across the two gaps and since there are two wings shown in these embodiments, this adjustment can be made. It is a delicate one.

Externally adjustable stressed reed

Where the wings have free ends, they must be used to give the reed a set. In the modified pitchfork type reed now to be described, the ends of the wing are constantly controlled. They are moved to a point and held. Such wings are able to hold the reed permanently and it follows that this modified transducer, the reed is not given a set but is stressed in whichever direction is required.

Figure 22:
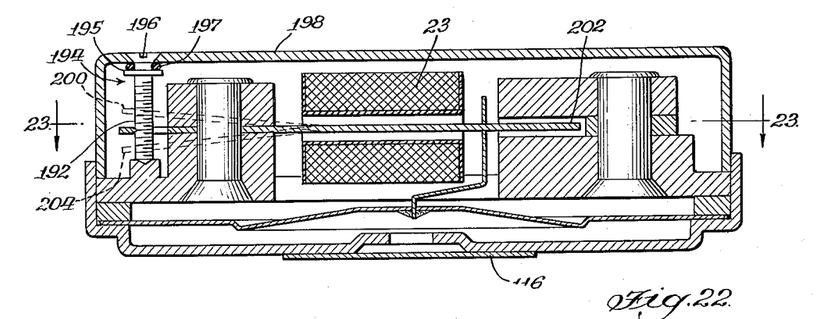
FIGURE 22 is a section of a transducer carrying an external control.
Figure 23:
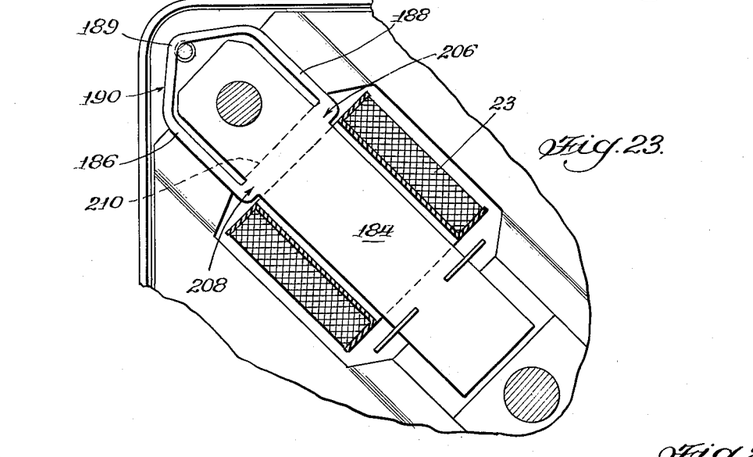
FIGURE 23 is a partial section taken along the line 23—23 of FIGURE 22.
Figures 24, 25:
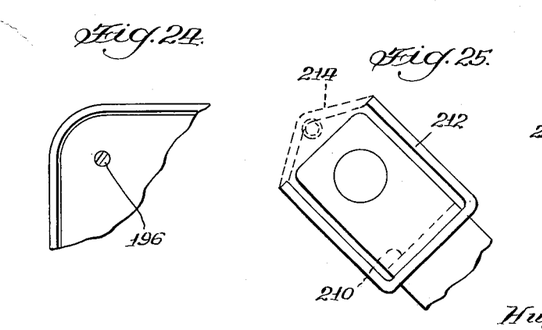
FIGURE 24 is an exterior plan view of the corner of the instrument shown in FIGURES 22 and 23.
FIGURE 25 is a view similar to that in FIGURE 23 and shows a modified armature.

In FIGURES 22, 23 and 24, the reed 184 has wings 186 and 188 which are joined at 189, thereby forming a yoke generally indicated as 190. This yoke is integral with the reed so that in making it, one stamps out a U-shaped slug. The inside apex of the yoke rides in the threads 192 of a captive screw 194. This screw has a collar 195 which presses an O-seal ring 197 against the underside of the case 198. The screw head 196 is locked to the main shank so that turning it will turn the shank in either direction. The head 196 of this screw seats in the exterior surface of the back wall 198 of the case.

This reed functions just in the same manner as the reed shown in the principal embodiment of this invention. In FIGURE 22, the dotted position 200 of the yoke causes the vibratory end of the reed 202 to move downwardly, while the dotted position 204 causes the end to move upwardly. These two positions are exaggerated. The movement is very slight and the threads on the screw 194 are very fine. A very slight pressure at the points of joinder 206 and 208 will cause a more pronounced movement of the free end 202 of the reed because of the length of the reed.

While the reed 184 functions in the same way as the reed in the principal embodiment of this invention, it is not intended that the reed be given a set along the clamping line 210. In this respect, the structure here shown differs fundamentally from that shown in the first embodiment. There, the wings are used to give the reed a set and the material of the reed may be softened so that such a set may be obtained. When the adjusting of the pitchfork type reed of the first embodiment has been completed, the openings through the case shown in FIGURE 12 are closed, and there is nothing to prevent the reed through use from slightly altering its set.

The structure shown in FIGURES 22, 23 and 24 may be described as one which stresses the reed. It is not the intention to place a permanent bend along or near the clamping line 210, but to continuously hold the free end 202 of the reed in the selected position. The material of the reed will, therefore, be more elastic. In this embodiment, the light variable flux will to a limited extent pass through the entire yoke. The screw 194 is made of material of low flux conductivity in order to minimize shunting of flux and the creation of stray fields.

FIGURE 25 discloses a reed to one surface of which adjacent the clamping line 210 has been welded a wire 212 of material of low flux conductivity. For some transducers, it is desirable to rely only upon the positioning of the free end of the reed 202 without employing the reinforcing effect of flux-conductive wings. It is difficult to adjust the flux-conductive wings in very small transducers. In the embodiment shown in FIGURE 25, the case would have a pair of openings similar to those in FIGURE 12 and the adjustment would be made by a tool which would be slipped in a very short distance through the case. The use of the wire of low-flux conductivity may be extended to the structure shown in FIGURES 22–24 as illustrated by the dotted position 214. Here the wire will stress the reed only.

*The opening through the case in alignment with one or both spaces adjacent the clamped gap*

Figure 11:
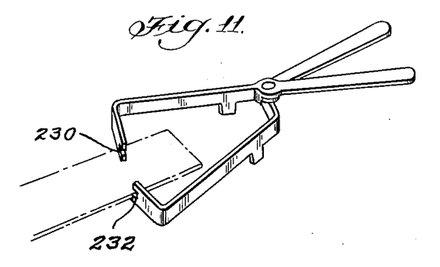
FIGURE 11 illustrates an end-approach tool which may be inserted through openings in the case of FIGURE 12 for engaging the armature.

Applicant initially adjusted the free end of the reed externally of the case by inserting a tool such as shown in FIGURE 11 which would engage a straight-edged reed, that is, one lacking the wings or the yoke joined at 206 and 208. The notches 230 and 232 grip opposite sides of the reed and move it up or down.

Access through the case to a passageway through which a tool may be inserted to a point adjacent the clamp line 202 has made it possible to recover transducers which were completely sealed in the case but did not function. Such transducers in the case have a value of approximately four percent of the selling price of the transducer. The feature making possible such adjustment is the straight passageway from the case to the edge of the reed adjacent the clamping point. These passages are 27 and 29 in FIGURES 15 and 16.

Having thus described my invention, what I claim is:

1. An electro transducer comprising a magnet, a pole piece flux-conductively associated with each pole of the magnet, one pole piece having a pair of portions facingly positioned to the other pole piece to form two gaps of low flux conductivity, one pair called a clamped gap and the other a working gap, an armature having one portion clamped in the clamped gap along a line transverse to the length of the armature and another portion vibratable in the working gap, there being an open space adjacent that edge of the armature in the clamped gap and between the pole pieces, a coil around the armature, means holding the said components in assembled relationship, and means mounted on the armature on the working gap side of said clamping line and extending toward an external surface of the transducer for moving the vibratable end of the armature in the working gap.

2. The transducer of claim 1 wherein the means for moving the vibratable end of the armature is positioned in the said space and engages the armature on the working gap side of said clamping line.

3. The transducer of claim 1 wherein the means for moving the vibratable end of the armature is a wing of flux-conductive material connected to the armature on the free side of said clamping line and extending along the side of the armature within said space.

4. The electro transducer of claim 3 wherein the wing is separated from the clamp portion of the armature by a gap.

5. The electro transducer of claim 4 wherein the wing is separated from the clamped portion of the armature by a gap extending from the transverse line of clamping of the armature to the end of the wing.

6. The electro transducer of claim 3 wherein the transducer is disposed in a case having an opening through the wall of the case adjacent to said space whereby a tool may be inserted into said space for engagement with the wing of the armature.

7. The electro transducer of claim 3 wherein the wing is separated from the clamped portion of the armature by a wall of less thickness than the wing.

8. The electro-acoustic transducer of claim 1 wherein the armature has a T-configuration in plan view and the side edges of the cross arm of the T and the short edges adjacent the stem are spaced outwardly from the edges of the gap.

9. An electro-acoustic transducer comprising a magnet, a pole piece flux conductively associated with each pole of the magnet, one pole piece having two portions facingly positioned to the other pole piece to form two gaps of low flux conductivity, one called the clamped gap and the other the working gap, an armature having one portion clamped in the clamped gap along a line transverse to the length of the armature and another portion vibratable in the working gap, a coil around the armature, means holding these components in assembled relationship, passageways adjacent the clamped gap, a case, and adjusting means anchored at one end to the armature adjacent the clamp line and extending through a passageway to a second end on the surface of the case whereby functioning the means on the case will move the armature within the case.

10. An electro-acoustic transducer comprising a magnet, a pole piece flux conductively associated with each pole of the magnet, one pole piece having two portions facingly positioned to the other pole piece to form two gaps of low flux conductivity, one called the clamped gap and the other the working gap, an armature having one portion clamped in the clamped gap along a line transverse to the length of the armature and another portion vibratable in the working gap, a coil around the armature, means holding these components in assembled relationship, a passageway adjacent the clamp gap, a yoke anchored to the armature adjacent the clamp line and extending through the passageway, a case enclosing the components and adjusting means accessible at the external surface of the case for moving the yoke at right angles to the plane of the armature.

11. The electro-acoustic transducer of claim 10 wherein the adjusting means are threads of a screw rotatable in the case and a portion of the yoke rides the threads of the screw.

12. The electro-acoustic transducer of claim 10 wherein the adjusting means are threads of a screw mounted on the transducer with its axis at substantially right angles to the plane of the armature and the yoke is a wire having a portion fastened to the armature near the clamp line and another portion in engagement with the threads of the screw.

13. The electro-acoustic transducer of claim 10 wherein the yoke is made of material of low flux conductivity.

14. An electro-acoustic transducer comprising two plate pole pieces, an armature, means holding the flat surfaces of the pole pieces and the armature in substantially parallel relationship with the armature between the pole pieces and spaced from each, a coil around the armature, a drive pin connected to the vibratable portion of the armature, means holding the said components in assembled relationship, an interior surface of one pole piece lying in a plane inclined to the surface of the other and converging toward the armature, and a magnet having one surface similarly and complementarily inclined to the inclined surface of said pole piece whereby the magnet may be pressed laterally into flush engagement with both pole pieces.

15. The electro-acoustic transducer of claim 1 wherein an interior surface of one pole piece lies in a plane inclined to the other and converging toward the armature, and a magnet having one surface similarly and complementarily inclined to the inclined surface of said pole piece whereby the magnet may be pressed laterally into flush engagement with both pole pieces.

16. An electro-acoustic transducer comprising two plate pole pieces, a permanent magnet disposed between portions of said pole pieces, means flux-conductively associated with the pole pieces for forming two gaps of low flux conductivity, an armature having a portion in each gap, a coil bobbin around the armature between the gaps, said bobbin carrying a supporting member extending into one gap adjacent the armature, means for clamping the armature and supporting member in said gap, a coil around the bobbin, a drive pin connected to the armature, and a magnet engaging flux conductively both pole pieces.

17. The transducer of claim 1 wherein the means for moving the vibratable end of the armature is a wing of low flux-conductive material connected to the armature on the free side of the clamping line and extending along the side of the armature within said space.

References Cited in the file of this patent

UNITED STATES PATENTS

| | | |
|---|---|---|
| 1,230,676 | Comer | June 19, 1917 |
| 1,573,739 | O'Neill | Feb. 16, 1926 |
| 2,037,255 | Miller | Apr. 14, 1936 |
| 2,092,884 | Kendall | Sept. 14, 1937 |
| 2,507,708 | Greener | May 16, 1950 |
| 2,511,114 | Lavery | June 13, 1950 |

FOREIGN PATENTS

| | | |
|---|---|---|
| 218,774 | Switzerland | Apr. 16, 1942 |
| 755,715 | Great Britain | Aug. 22, 1956 |